United States Patent
Lemon

(10) Patent No.: US 7,171,760 B1
(45) Date of Patent: Feb. 6, 2007

(54) HEIGHT INDICATOR GAUGE

(76) Inventor: William Lemon, 1204 Stevens Rd., Monroe, NC (US) 28110

(*) Notice: Subject to any disclaimer, the term of this patent is extended or adjusted under 35 U.S.C. 154(b) by 44 days.

(21) Appl. No.: 11/073,495

(22) Filed: Mar. 7, 2005

(51) Int. Cl.
*G01B 3/22* (2006.01)

(52) U.S. Cl. .......................................... 33/833; 33/628

(58) Field of Classification Search .................. 33/501, 33/571, 626, 628, 640, 783, 832–834, 836, 33/838
See application file for complete search history.

(56) References Cited

U.S. PATENT DOCUMENTS

| | | | |
|---|---|---|---|
| 495,019 A * | 4/1893 | Carter et al. .................. 33/640 |
| 2,743,527 A | 5/1956 | Gens |
| 2,759,269 A | 8/1956 | Haase et al. |
| D199,862 S | 12/1964 | Lowry |
| 3,205,586 A | 9/1965 | Mullen |
| 3,645,002 A * | 2/1972 | Hefti ............................ 33/628 |
| 3,758,957 A * | 9/1973 | Eskijian ....................... 33/834 |
| 4,779,354 A | 10/1988 | Hill |
| 4,930,221 A | 6/1990 | Taylor |
| 5,168,637 A | 12/1992 | Gibson |
| 5,170,569 A * | 12/1992 | Anderson ..................... 33/833 |
| 5,235,988 A * | 8/1993 | Johnson et al. ............... 33/836 |
| 6,446,348 B1 * | 9/2002 | Brian ........................... 33/833 |
| 6,662,456 B1 * | 12/2003 | Triplett ........................ 33/833 |
| 7,000,331 B2 * | 2/2006 | Kennedy ..................... 33/833 |
| 2006/0090363 A1 * | 5/2006 | Luner et al. .................. 33/833 |

* cited by examiner

*Primary Examiner*—G. Bradley Bennett
(74) *Attorney, Agent, or Firm*—Harpman & Harpman

(57) ABSTRACT

A measuring device for use with powered table saws and related equipment. The measuring device provides for a quick and easy determination and setting of cutting blade height on power equipment in a workshop. The device has a support cylindrical sleeve base with a height indicator slidably received therewithin. Incremental indicia on said height indicator relates to the portion of the blade above the work engagement surface of the tool by direct engagement therewith and the proportional distance of the height indicator extending above the cylinder sleeve base.

8 Claims, 3 Drawing Sheets

HEIGHT INDICATOR GAUGE

BACKGROUND OF THE INVENTION

1. Field of the Invention

This invention relates to measuring devices used to establish the cutting height of cutting blades of power table based tools such as a table circular saw or a table router bit.

2. Description of Prior Art

Prior art devices of this type have relied on a variety of different gauge designs that are engageable on the cutting elements of table based power tools, see for example U.S. Pat. Nos. 2,743,527, 2,759,269, 3,205,586, 4,779,354, 4,930,221, 5,168,637 and Design Patent D199,862.

In U.S. Pat. No. 2,743,527 a height gauge can be seen having a grooved angular inclined base plate with a pair of inner engaging longitudinal sliding adjustment plates. A height gauge extends from the plates vertically and provides engagement with an item to be measured in relation to the base plates.

U.S. Pat. No. 2,759,269 discloses an indicator gauge with an upstanding support arm which slidably receives a measuring bar therethrough. The bar extends downwardly for registration onto a measurable surface.

U.S. Pat. No. 3,205,586 claims a height indicator gauge for table saws that has a slotted frame member with an adjustable blade engagement plate movably positioned therewithin for engagement with the blade.

U.S. Pat. No. 4,779,354 is directed to a variable angle protractor that has a protractor body which is pivotally secured to a support surface engageable base with a slidable disposed measuring bar adjustably repositionable thereon.

U.S. Pat. No. 4,930,221 shows a universal precision measuring gauge having a pair of inner engaging elongated body members. The distance between the body members is indicated by measuring indicia on one of the body members.

U.S. Pat. No. 5,168,637 relates to a measuring device having a vertical support column with a movable horizontal foot extending therefrom. Measuring indicators on the column correspond to and indicate the relative position of the movable foot from the base support on which the column rests.

Design Patent D199,862 relates to a height gauge having a cylindrical body member with an arcuate engagement arm adjustably extending from an elongated slot therewithin. The arm is adjusted vertically onto the article to be measured.

SUMMARY OF THE INVENTION

A height indicator guide to be positioned over a saw blade or other cutting head of power tools that requires an exact measurement of blade height beyond the surrounding guide surface. A cylindrical sleeve base has a lockable blade engagement element slidably positioned therein. Access openings in the sleeve base allows for use on table saws providing blade clearance which extends beyond the sleeve.

DETAILED DESCRIPTION OF THE INVENTION

Figure 1:
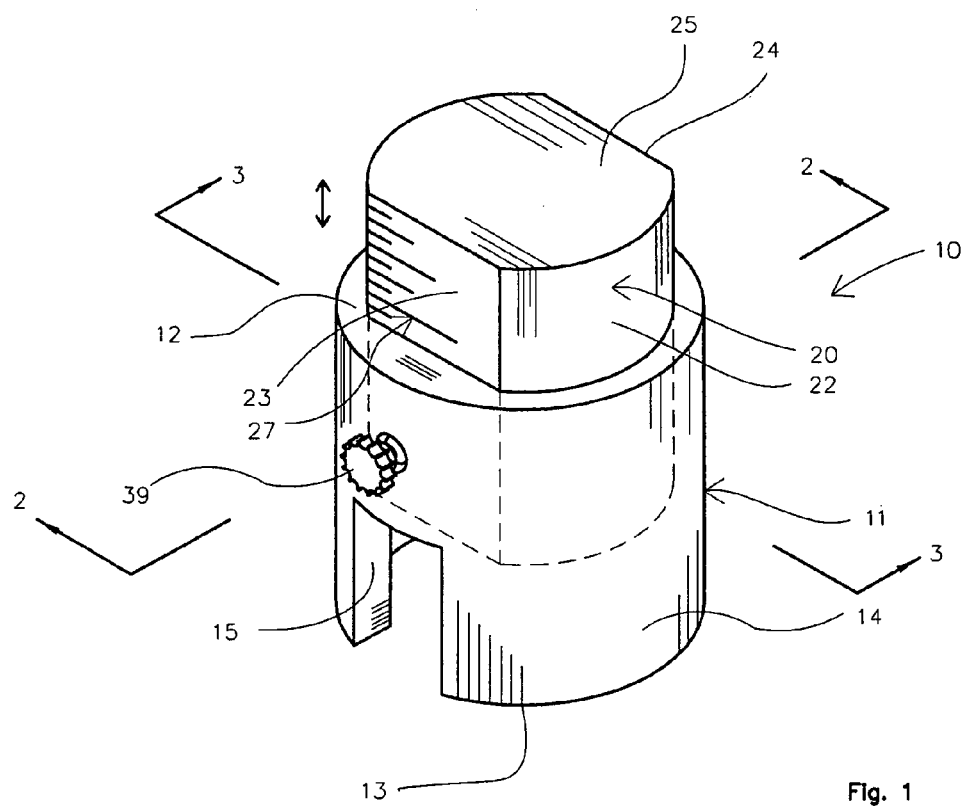
FIG. 1 is a perspective view of the height indicator gauge of the invention.
Figure 2:
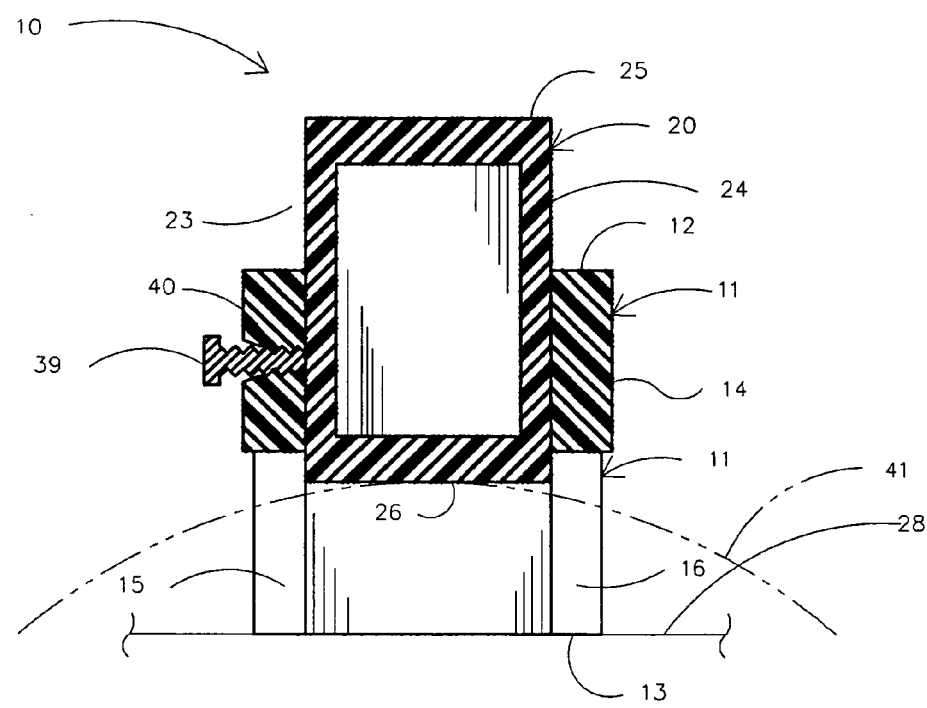
FIG. 2 is a cross-sectional view on lines 2—2 of FIG. 1.
Figure 3:
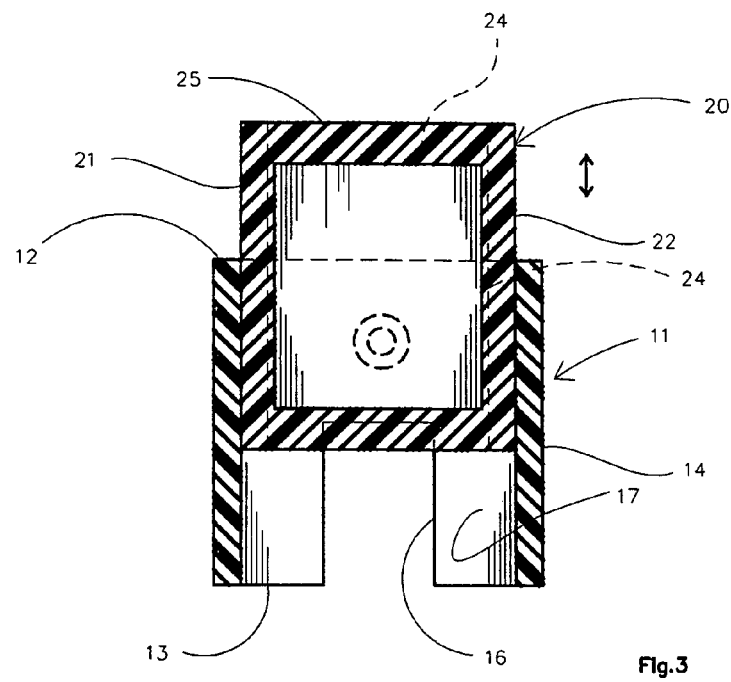
FIG. 3 is a cross-sectional view on lines 3—3 of FIG. 1.

Referring to FIGS. 1 and 2 of the drawings, the height indicator gauge 10 of the invention can be seen having a cylindrical sleeve support base 11 with top and bottom edges 12 and 13 respectively. The cylindrical sleeve support base 11 has a curved outer wall surface 14 and a pair of oppositely disposed blade access notches 15 and 16 therewithin. An inner wall surface 17 of the cylindrical sleeve support base 11 has two oppositely opposing flat surfaces 18 and 19 extending the length of the sleeve through which the hereinbefore described access notches 15 and 16 extend inwardly up from the bottom edge 13.

Figure 4:
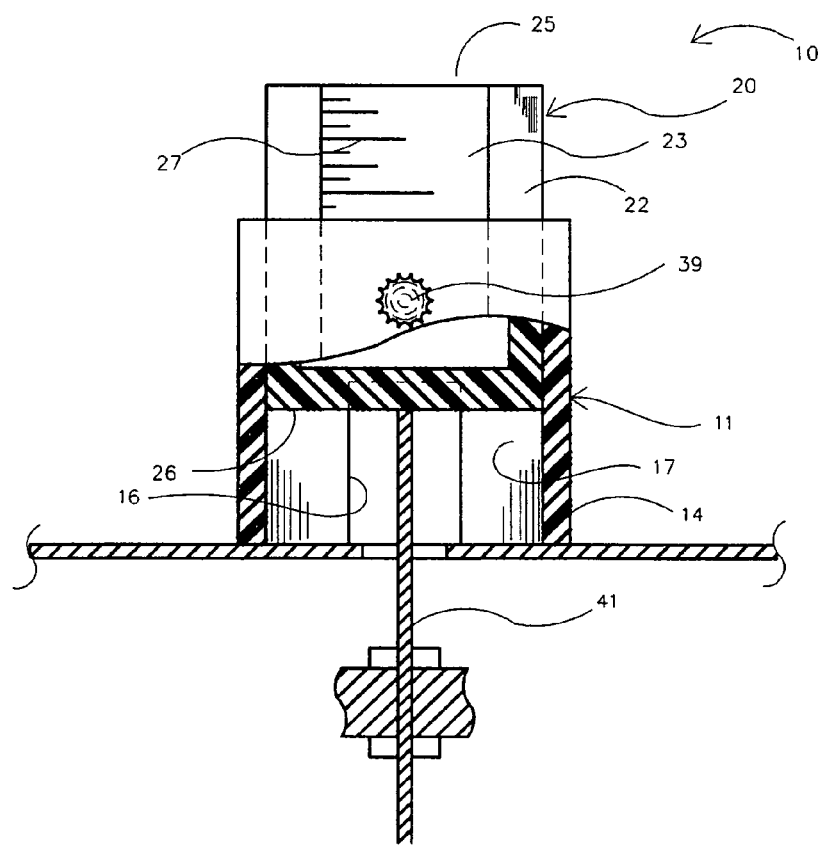
FIG. 4 is a side elevational view with portions in cross-section of the gauge position on and engaged with a table saw blade assembly.
Figure 5:
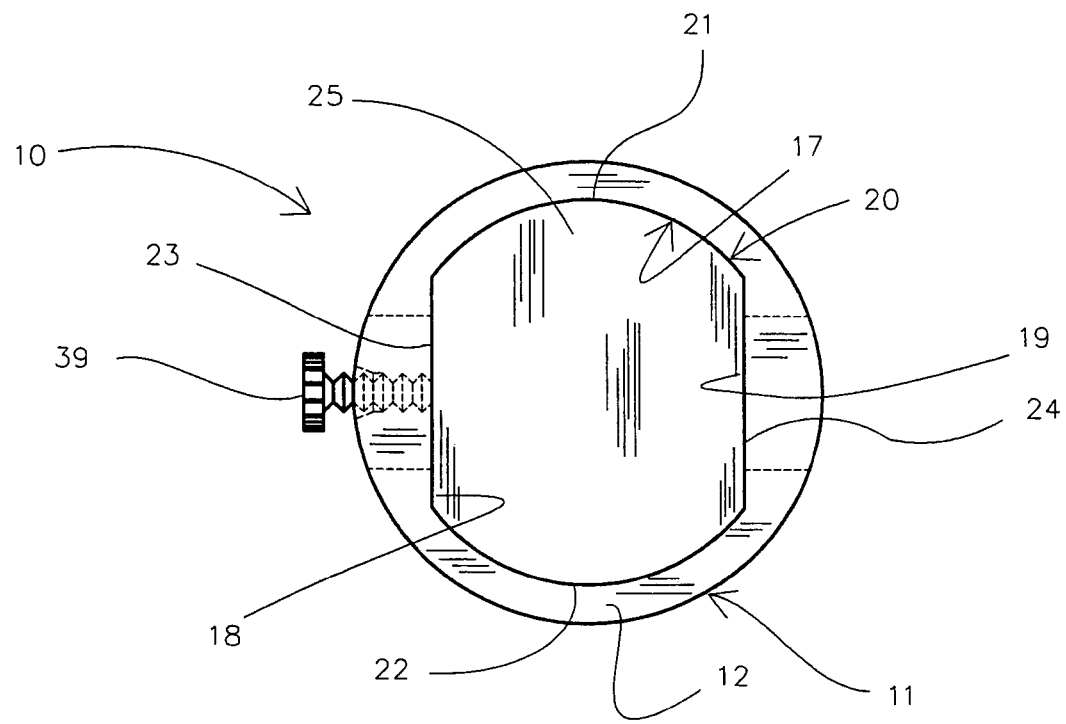
FIG. 5 is a top plan view of the gauge.
Figure 6:
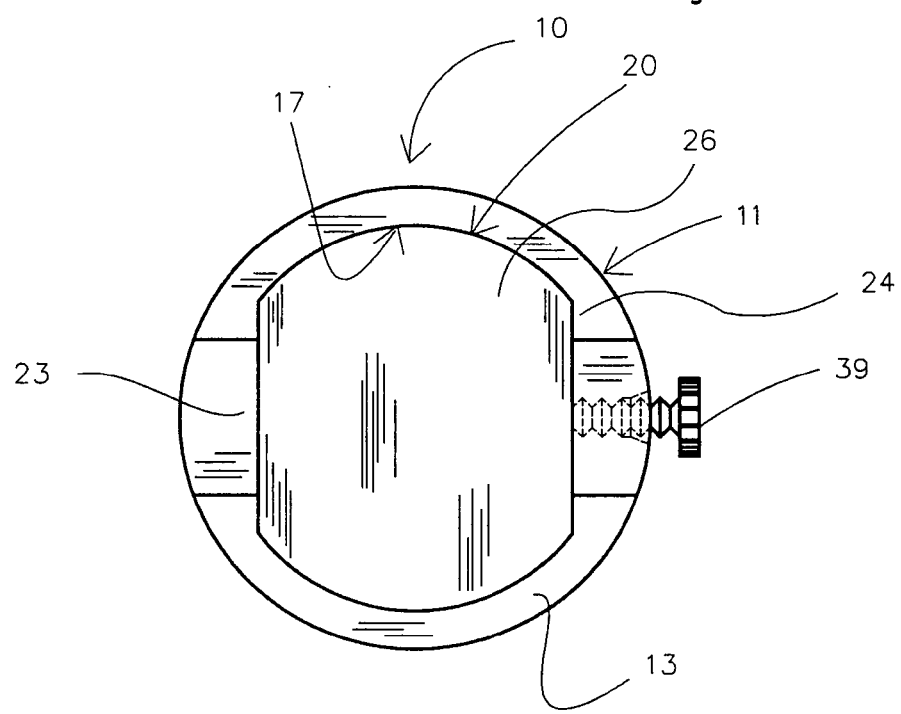
FIG. 6 is a bottom plan view of the gauge.

An indicator insert 20 is slidably disposed within the cylindrical sleeve support base 11 with corresponding opposing curved wall surfaces 21 and 22 and respective interconnecting parallel straight wall outer surfaces 23 and 24 as best seen in FIG. 5 of the drawings. The indicator insert 20 has a flat top 25 and a parallel flat blade engagement bottom surface 26. The indicator insert 20 is movable within the cylinder sleeve support base 11 having incremental measuring indicia 27 on its respective oppositely disposed wall surfaces 23 and 24 as best seen in FIGS. 1 and 4 of the drawings. The measuring indicia 27 is calibrated to indicate the relative height of the indicator insert 20 from a base engagement surface 28 on which the cylindrical sleeve support base 11 rests during use as best seen in FIG. 4 of the drawings.

A retainer fitting 39 is threadably disposed through a corresponding threaded bore 40 in the wall of the cylinder sleeve support base 11 in spaced aligned relation vertically above the access notch 15 so as to registerably engage against the outer surface 23 of the indicator insert 20 thereby selectively locking it in position therewithin.

In use, as seen in FIGS. 2 and 4 of the drawings in broken and solid lines, the height indicator gauge 10 of the invention is placed over a table saw blade 41, for example, which extends therebeyond through the hereinbefore described access notches 15 and 16. The cylinder sleeve support base 11 rests on the table base engagement surface 28 with the bottom surface 26 of the indicator insert 20 engaging on the perimeter edge of the saw blade 41. The height of the saw blade 41 above the table surface 28 is then indicated and read by the indicia 27 visually above the cylinder sleeve support base 11 as noted.

Technically, height indicator gauge 10 of the invention can be preset by a rotation of the retainer fitting 39 to the desired blade height and once positioned over the blade 41, the blade raised to engage the bottom 26 of the indicator insert 20. Alternately, in some applications, the indicator insert 20 is not initially locked within the cylinder sleeve support base 11 and once positioned over the blade 41 is raised by the engagement and elevation of the blade 41 indicating the saw blade height by the hereinbefore described indicia 27 on the indicator insert 20, accordingly the saw blade can be adjusted to the proper height.

It is also noted that the indicator insert 20 is of the same longitudinal dimension as that of the cylinder sleeve support base 11 so as the indicator insert 20 is elevated, it will physically emulate the height of the cutting element on which it is positioned, which is a visual confirmation of the cutting element height.

The height indicator gauge 10 can be made from a variety of materials preferably of molded synthetic resin material and it will be evident to those skilled in the art that various changes and modification may be made thereto without departing from the spirit of the invention.

I claim:

1. A measuring device for use on power tools to determine cutting element height comprises, a support sleeve base having a annular side wall with inner and outer wall surfaces, oppositely disposed parallel flat surface portions on said inner sidewall surface, oppositely disposed notches in said sidewall within said respective flat surface portions of said sidewall surface, an indicator insert slidably positioned within said support base sleeve, spaced parallel flat elongated surfaces on said indicator surface measuring indicia on said flat elongated surfaces on said indicator surface indicating the relative position of said indicator insert within said sleeve, means for selectively locking said indicator insert within said support sleeve.

2. The measuring device set forth in claim 1 wherein said oppositely disposed parallel flat surfaces on said inner sidewall surface of said support sleeve registering against said corresponding flat elongated surfaces portions of said indicator insert.

3. The measuring device set forth in claim 1 wherein said oppositely disposed notches in said sidewall are in translateral alignment with said measuring indicia on said indicator insert.

4. The measuring device set forth in claim 1 wherein said means for selectively locking said indicator insert within said support sleeve comprises, a threaded restraint fitting threadably disposed through said sidewall and engageable against a portion of said indicator insert.

5. The measuring device set forth in claim 1 wherein said support sleeve base and said indicator insert are made of synthetic resin material.

6. The measuring device set forth in claim 1 wherein said support sleeve base is of a known longitudinal length and said indicator insert is of a known length equal to that of said support sleeve base.

7. The measuring device set forth in claim 1 wherein displacement of said indicator insert from within said support sleeve base by engagement with a work tool cutting device is indicated by said indicia on said indicator insert and alignment with a top edge surface of said support sleeve base.

8. The measuring device set forth in claim 1 wherein said oppositely disposed notches in said sidewall of said support sleeve extend from a bottom edge surface of said support sleeve base.

\* \* \* \* \*